June 5, 1951 L. A. HABICHT 2,555,485
GAP GAUGE
Filed Feb. 2, 1948
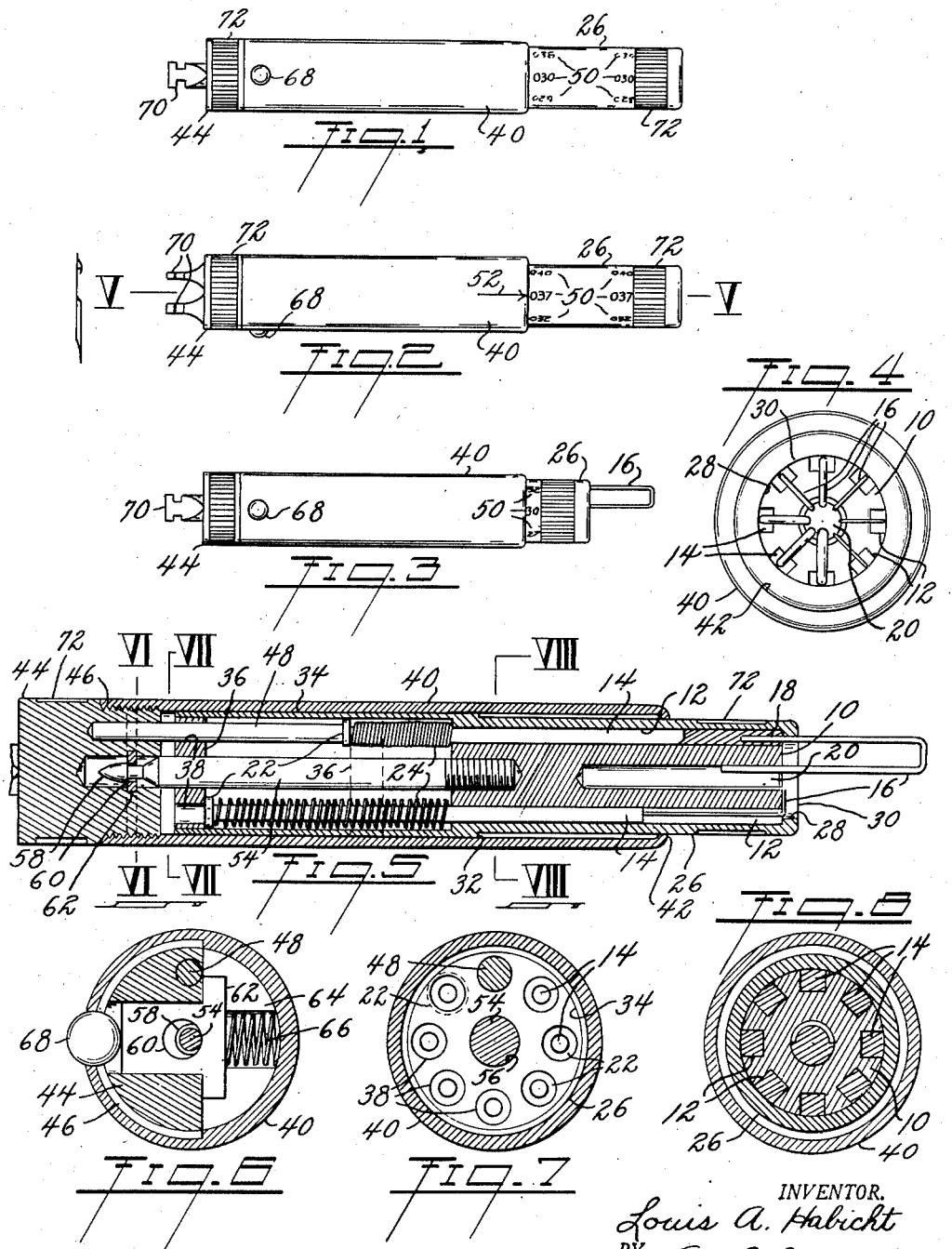
INVENTOR.
Louis A. Habicht
BY Wm O Ballard
his attorney Patented June 5, 1951

2,555,485

UNITED STATES PATENT OFFICE 2,555,485

GAP GAUGE

Louis A. Habicht, Toledo, Ohio

Application February 2, 1948, Serial No. 5,789

1 Claim. (Cl. 33—168)

This invention relates to gages.

An object of this invention is to provide a compact unit providing a plurality of gage elements particularly adapted for determining clearances such as spark plug gaps and the like.

Another object of this invention is to provide a set of gages combined into a tool wherein any selected one of the gage elements may be exposed for use while the remainder are not only protected by being housed within the tool but are free from interfering in the gage use.

Still another object of this invention is a gage set wherein all of the gage elements may be disposed within the tool when such is not in use.

Another object of this invention is to provide a telescopic housing for a set of gage elements which when collapsed will automatically lock in such position and expose a selected gage element for use and will expand to house all the elements by a simple push button operation.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of the device with the gage elements all housed therein;

Fig. 2 is a view of the tool of Fig. 1, from the top of Fig. 1;

Fig. 3 is a side elevation of the device in the same position as shown in Fig. 1 but with the housing telescoped to expose one of the gage elements ready for use;

Fig. 4 is an end view of the device from the right of Fig. 1;

Fig. 5 is a view on the line V—V, Fig. 2;

Fig. 6 is a view on the line VI—VI, Fig. 5;

Fig. 7 is a view on the line VII—VII, Fig. 5; and

Fig. 8 is a view on the line VIII—VIII, Fig. 5.

Fluted block 10 is preferably of cylindrical form having a predetermined number of flutes extending lengthwise along the surface thereof providing seats or guide-ways 12 for slide bars 14, one in each seat. These seats are disposed on the periphery of the carrier substantially parallel to each other and to the axis of the carrier and tool.

Each slidable member or bar has, attached to one end, a gage element 16, herein shown as a U-shaped wire with one leg fixed with the bar by having its terminus press-fitted within a seat 18 in the bar terminal, and the other leg freely disposed within well 20 axially of the block or carrier 10.

Each wire or gage element 16 is of a different diameter and together make up a set, herein shown as eight in number, and are of diameters most frequently employed in testing spark plugs. A typical set would include wires having diameters in steps between .015" and .040". Of course the number and sizes of the wires or similar gage elements is optional and if the tool is assembled for other uses, the gage elements will be selected accordingly.

In spark plug testing, the tool in many instances is subjected to rather severe thrusts against the metal shells and electrodes of the plugs and the diameter of the gage wires is necessarily small. By the use of the U-shaped gage elements 16, distortion thereof is minimized. An exposed free end gage wire thrust against a solid object tends to kink the same where a gage wire of the same diameter and U-shaped would absorb the same thrust. This is due to the free leg of the U bearing against the inner face of the well 20 and acting as a spring takeup or shock absorber. This U-shape also provides a gage extent not only lengthwise of the element but also at an angle thereto which is the base of the U, so the tool can be moved axially into and out of the spark gap to measure the same or the tool may be swung laterally through the gap, whichever is the more convenient.

The end of each bar 14, remote from the gage element is provided with an enlargement conveniently formed by peening a collar 22 thereon. This collar serves as a seat for spring 24 about the bar and extending between said collar and carrier 10 normally thrusting the collar end of the bar away from the block and accordingly housing the gage element with the major portion within the carrier.

The carrier 10 is nested within first tubular housing member 26 at one end thereof. This housing member has inwardly extending terminal ledge 28 defining aperture 30 through which the gage elements extend when the device is in use, which ledge provides a seat for positioning the block 10 therein. This housing member 26 is also provided with enlargement 32 intermediate its length and from which skirt portion 34 extends to form a chamber housing the springs 24 and mount closure plate 36 as a seat for the collars 22. This plate 36 is press-fitted into the adjacent terminus of the skirt 34 and has an aperture 38 therethrough axially aligned with each bar 14 and of slightly less diameter than the collars 22. There is thus provided a cage construction for the bars limiting and defining their movement as to the block.

The tube and skirt member is telescopically housed in a second tubular housing member 40 having inwardly extending terminal overhang 42 serving as a stop for the enlargement 32 in determining the limit which this inner tube may be withdrawn from the outer tube.

The opposite end of this outer member is closed by cap 44 having threaded connection 46 therewith. This cap 44 mounts indexing pin 48 located to be in coaxial alignment with any selected one of the apertures 38 through the plate 36.

In operation, the inner tube is brought to its full expanded position in relation to the outer tube. In this position the inner tube is freely rotatable and the desired thickness gage element to be exposed is indicated by bringing the desired indicia 50 on the tube 26 into alignment with the arrow 52 on the housing 40. At this point the pin 48 will be in alignment with the indicated gage element and collapsing of the inner member into the outer member will carry all the gage elements along with it but the indicated element which will have its mounting bar in contact with the pin 48 passing through the corresponding opening 38 and holding such bar against shifting with the cage.

Upon release the compressed spring 24 will cause the parts to expand to gage housing position.

Means are provided to lock the parts in telescoped gage exposing position. To this end, stem 54 is threaded into block 10 and extends therefrom through opening 56 in the plate 36 to terminate in tapered head 58. In movement to expose a gage element, the tapered head 58 passes through aperture 60 in lock plate 62 which is shifted thereby in slot 64 in the head or cap 44. The lock plate is shifted against the resistance of spring 66 and as the head passes beyond such plate, the spring will then shift the plate to have a portion thereof adjacent the aperture 60 engage the head thereby interlocking the parts and holding the housing members telescoped one within the other with the predetermined gage element exposed.

To reset the tool by releasing this automatic interlocking, it is only necessary to manually operate or push the partially exposed ball 68 which in turn shifts plate 62 against the resistance of spring 66, bringing the aperture 60 in axial alignment with the stem 54, and then which ever spring 24 is compressed between the index pin 48 and the block 10 will reset the parts and thereby encase all gage element within the tool.

The cap 44 may also mount suitable tools 70 for performing some operation on the article being inspected. The telescopic members also have knurled areas 72 to aid in manipulation of the device.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and it is desired to secure by United States Letters Patent:

In a tool of the class described, an outer tube having an open end, an inner tube telescopically movable through the open end and rotatably mounted by said outer tube, said inner tube having one end normally exposed beyond the extent of said outer tube, said exposed end having an inturned peripheral terminal ledge defining an aperture, a fluted carrier nested within said inner tube adjacent said ledge to have one end exposed through said aperture and coacting with said inner tube to define a guide way substantially parallel to the axis of said tool, said carrier having a well axially extending inwardly from the exposed end, a member longitudinally slidable along said guide way, a U-shaped gage element having a first terminal leg fixed with said member and extending toward the aperture, an intermediate leg extending radially toward the axis of said tool, its second terminal leg extending into said well, spring means coacting between said member and carrier to normally shift said member toward the inner end of the carrier to urge the intermediate gage leg inwardly from the aperture, and means in said tool in the path of said slidably mounted member at one relative position of rotation of the inner tube as to the outer tube whereby the telescoping of said tubes in such position will hold the slidably mounted member from shifting with said carrier and thus allow the intermediate gage leg to pass through said aperture to a position outwardly therefrom, said ledge limiting the outward movement of said gage from the carrier to retain a portion of the second leg within said well in a position to engage the wall of said well when lateral pressure is exerted against the exposed portion of said gage.

LOUIS A. HABICHT.

REFERENCES CITED

The following references are of record in the file of this patent:

UNITED STATES PATENTS

| Number | Name | Date |
| --- | --- | --- |
| 1,304,590 | Nardi | May 17, 1919 |
| 1,593,347 | Nardi | July 20, 1926 |
| 1,993,896 | Rabezzana | Mar. 12, 1935 |
| 2,237,378 | Thienemann | Apr. 8, 1941 |
| 2,439,363 | Habicht et al. | Apr. 6, 1948 |